United States Patent [19]
Wilbeck

[11] 3,708,018
[45] Jan. 2, 1973

[54] TWIN-OFFSET DISC IMPLEMENT WITH RELEASABLE FASTENING MEANS CONNECTING DUAL FRAMES

[75] Inventor: Robert A. Wilbeck, Reno, Kans.
[73] Assignee: Wilbeck Machine and Manufacturing, Inc., South Hutchinson, Kans.
[22] Filed: Feb. 22, 1971
[21] Appl. No.: 117,343

[52] U.S. Cl. ............... 172/313, 172/328, 172/568, 172/587, 280/411 R
[51] Int. Cl. ............................................. A01b 23/04
[58] Field of Search ............... 172/245-246, 248, 172/249, 250, 253, 310-311, 313-314, 319-320, 328, 255, 568, 581, 584, 587, 597, 680; 56/228; 280/409, 412, 413, 414.5

[56] References Cited

UNITED STATES PATENTS

| | | | |
|---|---|---|---|
| 2,733,935 | 2/1956 | Whiteley | 280/477 |
| 2,794,657 | 6/1957 | Anderson | 280/477 |
| 3,544,131 | 12/1970 | Pennington | 172/311 |
| 3,544,130 | 12/1970 | Hayes | 172/311 |
| 2,709,085 | 5/1965 | Stueland | 280/412 |
| 3,387,861 | 6/1968 | Bauman | 280/412 |
| 3,213,946 | 10/1965 | Carrick | 172/587 |
| 2,469,622 | 5/1949 | Acton | 172/255 |
| 2,136,550 | 11/1938 | Howard | 172/314 |
| 3,292,714 | 12/1966 | Tsuchiya et al. | 172/328 |
| 3,047,075 | 7/1962 | Frank | 172/584 |
| 3,515,223 | 6/1970 | Youngberg et al. | 172/310 |
| 3,528,506 | 9/1970 | Drummond | 172/314 |
| 3,480,085 | 11/1969 | Tilbury et al. | 172/311 |

Primary Examiner—Robert E. Pulfrey
Assistant Examiner—C. W. Hanor
Attorney—Fishburn, Gold & Litman

[57] ABSTRACT

A twin-offset disc implement particularly effective for earth working operations on uneven ground, is disclosed which includes a pair of mobile frames each having an adjustable tongue structure on a forward end thereof for connecting the frames to a prime mover and a fastening member extends between the frames for positioning the frames in side-by-side relation and has opposite ends thereof mounted on the frames to permit independent raising and lowering of the frames during working terraces and uneven ground.

8 Claims, 7 Drawing Figures

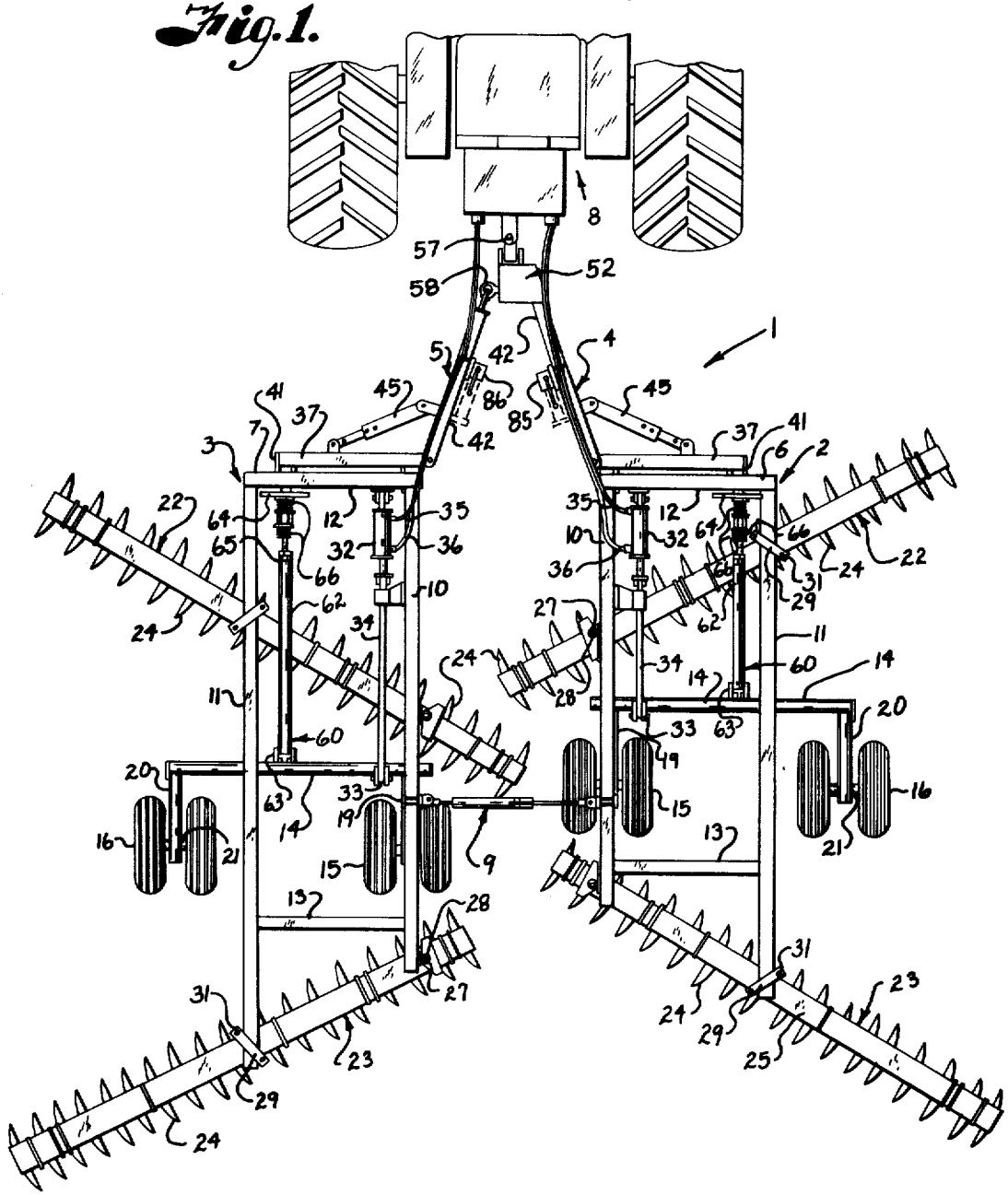

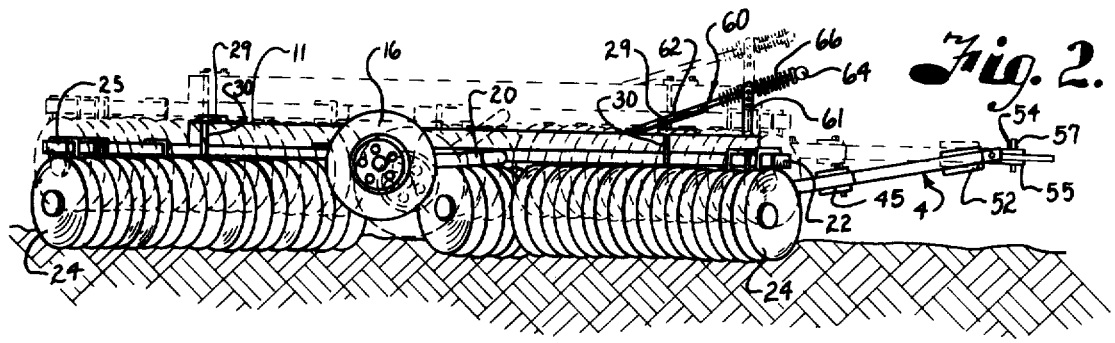
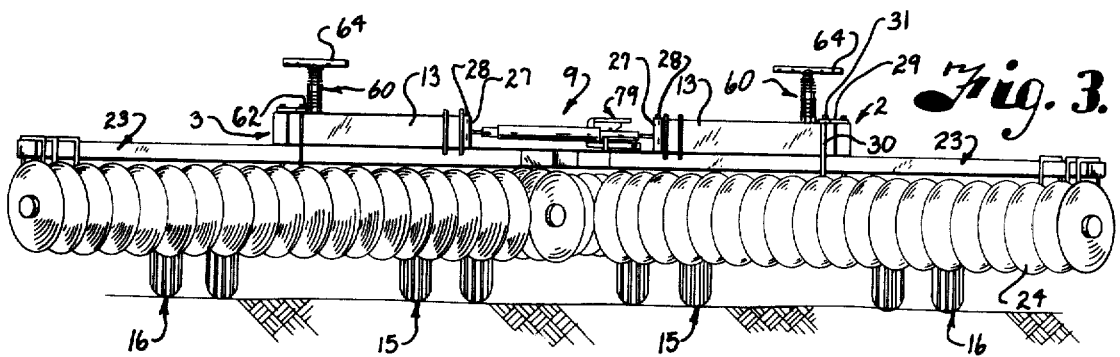
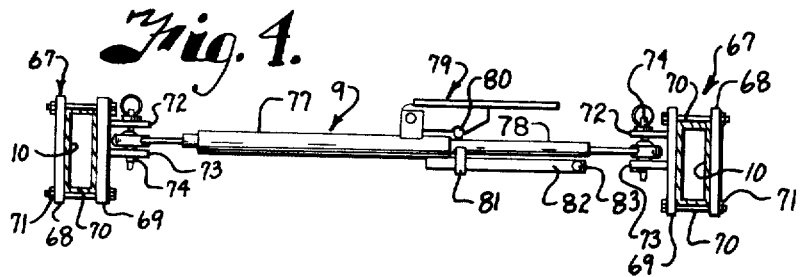

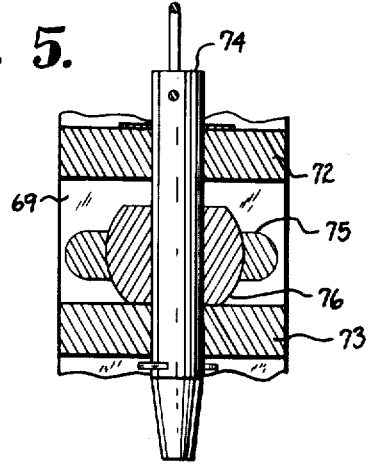
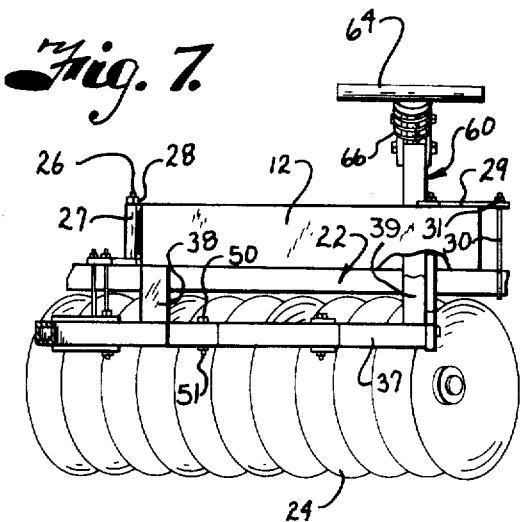
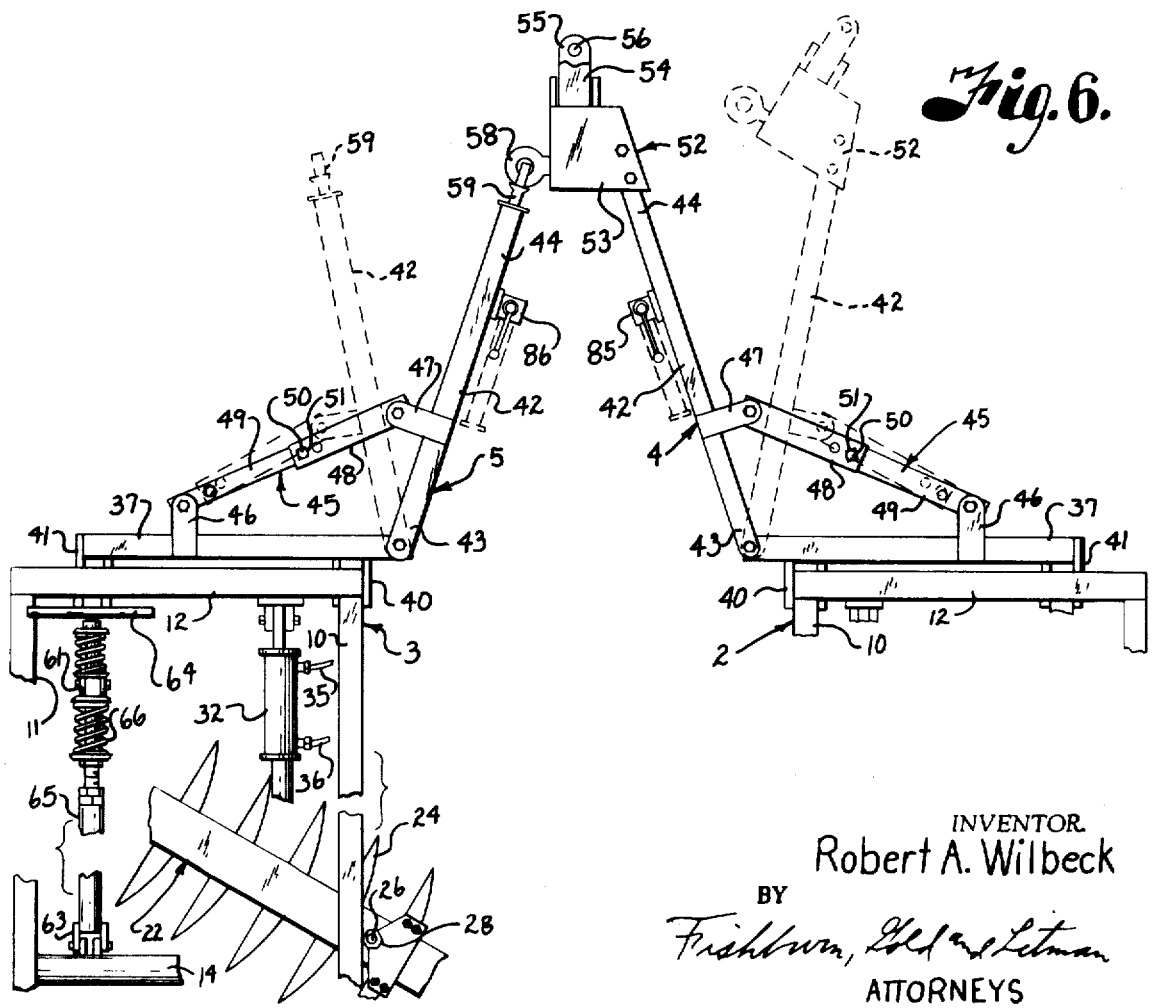

TWIN-OFFSET DISC IMPLEMENT WITH RELEASABLE FASTENING MEANS CONNECTING DUAL FRAMES

The present invention relates to offset disc implements and more particularly to a twin-offset disc implement having a pair of units maintained in a side-by-side position and having means engageable with the units to permit same to be independently raised and lowered.

The principal objects of the present invention are: to provide a twin-offset disc implement having independently suspended and leveled units maintained in side-by-side relation and which is particularly effective for use on uneven ground as well as level ground; to provide such a twin-offset disc implement capable of accomplishing substantially tight turns in either direction by raising an inside unit while maintaining an outside unit in ground or earth working engagement; to provide such a twin-offset disc implement which is substantially free from sidedraft and which permits simple operation and adjustment in the field by a single operator; to provide such a twin-offset disc implement which effects even penetration for the full width of the soil or earth working pass; to provide such an implement having a self-leveling device on each unit and which may be adjusted independently of the other unit; to provide such a twin-offset disc implement adapted to straddle peaks or valleys of terraces thereby utilizing an independent suspension of each unit for proper depth control even in the hardest ground; to provide such a disc implement wherein the paths of the discs of the units overlap at the centerline of the twin-offset disc implement to effect complete tillage of said centerline while neither ridging the soil or leaving any soil untilled between the units; and to provide such a twin-offset disc implement which is unique and simple in design, durable in construction, economical to manufacture, easily maintained, positive in operation, and particularly well adapted for the proposed use.

Other objects and advantages of this invention will become apparent from the following description taken in connection with the accompanying drawings, wherein are set forth by way of illustration and example, certain embodiments of this invention.

FIG. 1 is a plan view of a twin-offset disc implement embodying features of the present invention and having a pair of mobile units in side-by-side relation for working of fields.

FIG. 2 is a side elevational view of the twin-offset disc implement in earth working position and showing a raised position thereof in broken lines.

FIG. 3 is a rear elevational view of the twin-offset disc implement showing discs of the units positioned to have paths of end discs overlap at the centerline of the implement.

FIG. 4 is an enlarged fragmentary elevational view of a fastening member for maintaining the units in a spaced side-by-side position while permitting independent raising and lowering of each of the units.

FIG. 5 is an enlarged fragmentary sectional view showing a universal joint for each end of the fastening member to permit relative movement in any direction between the fastening member and the units.

FIG. 6 is an enlarged fragmentary plan view of tongue structures of the units for connection to a prime mover and showing an alternate position for each tongue structure in broken lines.

FIG. 7 is an enlarged fragmentary front elevational view.

Referring more in detail to the drawings:

As required, detailed embodiments of the invention are disclosed herein, however, it is to be understood that the embodiments are merely exemplary of the invention which may be embodied in many forms that are different from those illustrative embodiments presented herein. Therefore, specific structural and functional details disclosed herein are not to be interpreted as limiting but merely as a basis for the claims actually defining the scope of the invention. In this regard, it is to be recognized that twin-offset disc implements in accordance herewith may be embodied in various forms having various mobile supports and disc gang arrangements and furthermore that such structures may be variously actuated, leveled, and adjusted, however, the disclosure hereof is presented only as a representative basis for teaching one skilled in the art to variously employ the present invention in virtually any appropriate detailed structure.

The reference numeral 1 generally designates a twin-offset disc implement particularly effective for use in earth working operations on terraces and uneven ground and includes a pair of mobile frames 2 and 3, shown as right and left respectively, having adjustable tongue structures 4 and 5 mounted on respective forward ends 6 and 7 thereof for connecting same together and to a prime mover 8 and cooperating with a fastening member 9 for positioning and maintaining the frames 2 and 3 in a side-by-side position for working soil in fields. The fastening member 9 connects the frames 2 and 3 and permits independent raising and lowering thereof during working of uneven ground.

Each of the frames 2 and 3 are similar in construction except for the tongue structures 4 and 5. When the nature of the implement is such that a difference is desired, as for example, an overlapping of the respective working areas, then one of the frames, for example, the right frame 2 may be slightly shorter than the left frame 3, as later described. Each of the frames 2 and 3 has laterally spaced side members 10 and 11, shown as inside and outside respectively when the frames are in the side-by-side position. The side members 10 and 11 each have their forward ends suitably secured to a forward or front member 12 of the frames 2 and 3. A rear member 13 extends between and has opposite ends secured to the side members 10 and 11 respectively and is positioned to thereby form a substantially rigid frame.

Independently raising and lowering of the mobile frames 2 and 3 is desired to selectively move ground or earth working elements into and out of earth working position, therefore, an elongated shaft 14 is rotatably mounted on each of the frames 2 and 3 and has rotatably mounted ground engaging members, such as wheels arranged in pairs 15 and 16, at opposite ends of the elongated shaft 14 respectively to thereby movably support the respective frames 2 and 3. In the illustrated structure, the elongated shaft 14 is positioned below the side members 10 and 11 and is supported in suitable bearings (not shown) mounted in brackets 17 and 18 depending from the side members 10 and 11 respectively. Arms 19 and 20 depend from opposite ends of the elongated shaft 14 and each have a suitable axle 21 mounted adjacent a lower end thereof and extending outwardly from opposite sides of said arms for rotatably mounting the respective pairs 15 and 16 of wheels.

The twin-offset disc implement has suitable elements or members mounted on each of the mobile frames 2 and 3 for earth working as the frames are moved forward by the prime mover 8. The earth working members may have any suitable shape, such as plows, rakes, chisels, discs, or the like, however, in the illustrated structure, the implement has at least one gang of earth working discs being mounted on each frame with the gangs having adjacent ends thereof in overlapping relation to effect tillage of the soil on the centerline of the implement 1. In the illustrated structure, the elongated shaft 14 is positioned intermediate the ends of the respective frames 2 and 3 and front and rear gangs 22 and 23 respectively of spaced discs are mounted on the frames 2 and 3 and forwardly and rearwardly of the elongated shaft 14.

The front and rear gangs 22 and 23 and the discs 24 thereon for each mobile frame 2 and 3 are positioned to equalize forces applied to the respective frame during earth working operations whereby each frame and the implement 1 will move forwardly without sidedraft thereby effecting a simple operation of the implement 1.

In the illustrated structure, the front gang 22 on one of the mobile frames, for example, the right frame 2, is positioned forwardly of the front gang 22 on the other or left frame 3 to permit the adjacent ends of the front gangs 22 to overlap at the centerline of the implement. The front gangs 22 on the frames 2 and 3 diverge outwardly and forwardly from the adjacent ends thereof and at substantially equal angles with the centerline of the implement.

The rear gangs 23 on the right frame 2 is positioned forwardly of the rear gang 23 on the left frame 3 to thereby permit the right frame to be slightly shorter than the left frame and the rear gangs 23 on the frames 2 and 3 diverge outwardly and rearwardly from the adjacent ends thereof and at substantially equal angles with the centerline of the implement whereby the sidedraft of the front gangs 22 is equalized by the sidedraft of the rear gangs 23 for each frame and for the entire implement 1.

The front and rear gangs 22 and 23 are adjustable in position on the respective mobile frames 2 and 3 to compensate for a change in the direction of application of a pulling force, as when one of the mobile frames is used alone for earth working operations. In the illustrated structure, each gang of discs 24 includes a beam or support member 25 having a shaft or pin 26 extending upwardly therefrom to be received in a sleeve 27 mounted on the inside side member 10 of the respective frame and the pin 26 is suitably retained in the sleeve 27, as by having an upper end thereof threaded to receive a suitable nut 28 thereon to thereby pivotally support the inside end of the respective beam or support member 25 on the inside side member 10 adjacent the centerline of the implement 1.

The other end of each beam or support member 25 is adjustable along the outside side member 11 to vary the direction of application of the earth working force of the respective gang of discs 24 to the mobile frame supporting same to balance the force of the other gang of discs 24 on the respective mobile unit. In the illustrated structure, a suitable clamp supports the beam 25 in clamped engagement with the respective outside side member 11 and includes a pair of spaced plates 29 held in engagement with the side member 11 and the beam 25 respectively by suitable fastening members, such as a plurality of spaced bolts 30 each having one or more nuts 31 removably mounted on one end thereof.

Rotation of the elongated shaft 14 is effective to raise and lower the respective frame 2 and 3 and the gangs 22 and 23 of discs 24 mounted thereon. In the illustrated structure, a suitable extensible member 32 is mounted on each frame and has one end secured to the forward member 12 of the respective frame and the other end pivotally connected to an ear 33 extending from the elongated shaft 14 whereby extension and retraction of the extensible member 32 is effective to rotate the elongated shaft 14 to thereby selectively raise and lower the respective frame to move the earth working elements or members into and out of an earth working position.

The extensible member 32 is illustrated as a hydraulic cylinder having a suitable piston movable therein to extend and retract a piston rod 34 in response to communication of suitable hydraulic fluid to the cylinder adjacent opposite ends thereof. The hydraulic cylinder is connected in a conventional manner by suitable hydraulic lines 35 and 36 adjacent respective opposite ends to a source of hydraulic power, such as a hydraulic pressure system on the prime mover 8 which is under control of the operator thereof. The hydraulic lines 35 and 36 for each extensible member 32 are so connected to the source of hydraulic power that each frame may be independently and selectively raised and lowered.

The tongue structures 4 and 5 are substantially similar in construction and in the illustrated structure, each includes a base member 37 mounted on the forward or front member 12 of the respective frame and each of the base members 37 are pivotally mounted for movement in an arc about the forward ends 6 and 7 of the frames 2 and 3 respectively. In the illustrated pivotal mounting, the forward member 12 of each of the frames has depending portions 38 and 39 adjacent respective opposite ends thereof and each base member 37 has spaced ears arranged in pairs 40 and 41 adjacent respective opposite ends thereof with the pairs of ears of the base member 37 being pivotally mounted on the depending portions 38 and 39 respectively.

Each of the tongue structures 4 and 5 includes a draw member 42 having one end 43 thereof pivotally mounted on the respective base member 37 and extending forwardly therefrom. The one end 43 is preferably mounted adjacent an end of the base member 37 nearest the centerline of the twin-offset disc implement 1 when the frames 2 and 3 are positioned in working side-by-side relation. The draw members 42 each are elongated members having the respective axis thereof forming substantially equal angles with the centerline of the implement 1 when the other or free ends 44 of the draw members 42 are connected together and the units are in side-by-side working position.

Each tongue structure includes an adjustable spreader member 45 extending between and having opposite ends thereof pivotally connected to the base member 37 and the draw member 42 respectively for adjusting an angular relation between the base member 37 and the draw member 42. In the illustrated structure, ears 46 extend from the base member 37 and ears 47 extend from the draw member 42 for pivotally supporting respective opposite ends of the spreader member 45. The spreader member 45 is adjustable in length and is illustrated as having a tubular first portion 48 and a second portion 49 slidably received therein with the portions 48 and 49 each having a plurality of apertures spaced therealong with the apertures in the first and second portions 48 and 49 being selectively alignable to receive therein suitable fastening devices, such as bolts 50 and nuts 51, for holding the spreader member 45 in a selected adjusted position.

Free ends of the draw members 42 of the tongue structures 4 and 5 have means thereon for effecting a connection between the tongue structures 4 and 5 and the prime mover 8. In the illustrated structure, the draw member connection means includes a clevis assembly 52 mounted on a free end of one of the draw members 42, for example, the draw member of the tongue structure 4 mounted on the right frame 2.

In the illustrated embodiment, the clevis assembly 52 includes a mounting portion 53 suitably secured on the free end 44 of the respective draw member, as by welding, and vertically spaced upper and lower plates 54 and 55 respectively extending forwardly from the mounting portion 53 and each having an aperture 56 therein. The apertures are aligned and positioned to be on the centerline of the implement 1 when the frames 2 and 3 are in side-by-side position and to receive a suitable fastening member 57, such as a pin, bolt, or the like, to pivotally connect the clevis assembly 52 to the prime mover 8.

A towing ring 58 is mounted on the clevis assembly 52 and extends laterally outwardly therefrom to be releaseably engaged by a pintle hook 59 secured on a free end of the draw member 42 of the tongue structure 5. When the pintle hook 59 engages the towing ring 58 and the clevis assembly 52 is connected to the prime mover 8 and the fastening member 9 is in position between the frames 2 and 3, forward movement of the prime mover 8 effects coordinated forward movement of both of the frames 2 and 3, such as for earth working of fields and traveling between fields.

The mobile frames 2 and 3 are independently adjusted by a leveling device 60, to maintain same in a substantially level position during earth working operations. In the illustrated structure, each leveling device 60 includes a suitable lever 61 which has a lower end thereof connected to the base member 37 of the respective tongue structure 4 and 5 and pivotally mounted on one of the depending portions of the front member 12 and an adjustable member 62 extends between and has respective opposite ends pivotally connected on an upper end of the lever 61 and an ear or arm 63 extending outwardly from the elongated shaft 14.

A suitable handle or crank 64 is mounted on an upper end of the adjustable member 62 for effecting a change in the length thereof, as by a telescopeable joint 65 intermediate the ends thereof, and movement of the lever 61 and thereby movement of the base member 37 of the respective tongue structures 4 and 5 to thereby adjust the vertical position of the respective tongue structure and the vertical position of the forward end of the respective mobile frame to thereby level same when the earth working elements are in any selected position. Suitable resilient members 66 are mounted on the adjustable member 62 and positioned on opposite sides of the upper end of the lever 61 to absorb shock during earth working operations.

The fastening member 9 is preferably a substantially rigid member adapted to resist and withstand both tension and compression as the mobile frames 2 and 3 are performing earth working operations. The fastening member 9 has universal connections with the frames to permit independent relative movement therebetween. It is preferable that the members 9 be formed in two sections which may be connected together to form a rigid structure and which permits relative movement between the two sections to lock the frames in the side-by-side working position and to release and permit one of the frames to be removed to thereby perform earth working operations with only one of the mobile frames.

The illustrated fastening member 9 extends between and is connected to the mobile frames 2 and 3 for maintaining same in spaced side-by-side relation and includes a mounting bracket 67 on each of the facing side members 10 of the frames 2 and 3 for supporting respective opposite ends of the fastening member 9, as later described. Each mounting bracket 67 includes a pair of spaced plates 68 and 69 secured in clamping engagement with the respective side member 10 by suitable fastening devices, such as plurality of spaced bolts 70 having nuts 71 thereon.

The plates facing the centerline of the twin-offset disc implement 1 each have upper and lower ears 72 and 73 respectively secured thereto and extending outwardly and toward the centerline of the disc implement 1. The ears 72 and 73 of each mounting bracket 67 have aligned apertures therein to receive a suitable pin 74 for extending through an aperture in the respective end of the fastening member 9 for pivotally mounting the respective opposite ends of the fastening member 9 on the facing inside side members 10 of the frames 2 and 3.

The ends of the fastening member 9 are formed in ball and socket or universal joints to permit relative movement in any direction between the frames and the fastening member. In the illustrated structure, each of the ends of the fastening member 9 includes a ring portion 75 having a ball portion 76 therein to form a ball and socket joint. The lower ears 73 of each mounting bracket 67 receive the respective ball portion 76 thereon to thereby support same and permit movement of the frames and fastening member in substantially any direction.

In the illustrated structure, the fastening member 9 has separable portions connectable together and includes a first portion 77 having one end thereof mounted on one of the mounting brackets 67 and a second portion 78 having one end thereof pivotally mounted on the other mounting bracket 67. The first portion 77 is generally tubular and adapted to receive a free end of the second portion 78 therein and the fastening member 9 includes means on the other or free ends of the first and second portions 77 and 78 for effecting a releaseable connection therebetween. In the illustrated connection means, one of the portions, for example the first portion 77, has a release member 79 pivotally mounted thereon which is engageable with an enlarged portion 80 of the second portion 78. The engagement is effective to move and hold the first and second portions 77 and 78 together to maintain a selected spacing between the frames 2 and 3 and form a rigid member extending therebetween.

The second portion 78 of the fastening member 9 is guided into the first portion 77 by a suitable eye or guide 81 mounted on the second portion 78 and movable along an extension 82 of the first portion 77. The eye or guide 81 is movable between the free end of the first portion 77 and a stop or abutment 83 removably mounted on a free end of the extension 82.

In preparation for using a twin-offset disc implement constructed as described and illustrated, the frames 2 and 3 are positioned in side-by-side relation and the tongue structures 4 and 5 are connected together and to the prime mover 8 and the fastening member 9 is connected together by the release member 79 engaging the enlarged portion 80 to thereby lock the portions of the fastening member 9 together and maintain the frames 2 and 3 in a selected lateral spacing while permitting same to be independently raised and lowered and positioned in a substantially level position by operation of the leveling device 60. The extensible member 32 of each frame is independently adjusted to effect the desired penetration of the discs 24 of the front gang 22 and the rear gang 23 and the frames 2 and 3 are independently adjusted by the leveling device 60 to position and maintain the respective frame in a substantially level position during earth working operations and during travel between fields and the like.

When it is desired to turn the twin-offset disc implement 1, and for particularly tight turns, either to the right or left, the inside frame is raised by operation of the respective extensible member 32 and the adjustment of the respective tongue structure by operation of the respective leveling device 60. The turn is then completed while leaving the outside unit in the ground.

When it is desired to use only one of the units, for example, the right unit, the other or left unit is disconnected from the implement 1 by disconnecting the first and second portions 77 and 78 of the fastening member 9 and the draw member 42 of the other or left unit from the draw member 42 of the right unit. The spreader member 45 of the tongue structure 4 is adjusted in length, as shown in broken lines in FIG. 6, to position the right unit directly behind the prime mover 8 and to permit the prime mover 8 to pull the right unit forward. The other or left unit may be similarly connected to the prime mover 8 by mounting a suitable tow ring thereon and connecting the pintle hook 59 thereto and adjusting the length of the respective spreader member 45, as shown in broken lines in FIG. 6.

The draw members 42 of the tongue structures 4 and 5 have suitable jacks 85 and 86 respectively mounted thereon to support and raise and lower same as desired during connecting same together and to the prime mover 8.

It is to be understood that while I have illustrated and described one form of my invention, it is not to be limited to the specific form or arrangement of parts herein described and shown.

What I claim and desire to secure by Letters Patent is:

1. A twin-offset disc implement comprising:
   a. a pair of spaced mobile frames positioned in side-by-side relation and each having a forward end and laterally spaced side members and at least one gang of discs, said gangs having adjacent ends thereof in overlapping relation;
   b. means on each of said mobile frames for selectively raising and lowering said respective frame and the gang of discs thereon to move same into and out of an earth working position, said raising and lowering means on one of said mobile frames being operable independently of the raising and lowering means on the other mobile frame;
   c. an adjustable tongue structure mounted on the forward end of each of said mobile frames for effecting connection of said frames to a prime mover;
   d. each adjustable tongue structure has a base member mounted on a forward end of the respective mobile frame and a draw member having one end pivotally mounted on said respective base member and an adjustable spreader member having opposite ends pivotally connected to said base member and said draw member respectively for adjusting an angular relation between said base member and said draw member;
   e. one of said draw members has an assembly mounted on a free end thereof for connection to the prime mover;
   f. said assembly has means thereon for releaseably connecting and supporting the free end of said other draw member whereby forward movement of the prime mover effects forward movement of both of said mobile frames; and
   g. fastening means connected to and extending between said mobile frames, said fastening means having a first elongate member with one end thereof connected to one mobile frame by a universal joint, said first elongate member having a tubular portion extending toward the other mobile frame, a second elongate member having a portion slideably and separably received in the tubular portion of said first elongate member and extending therefrom and terminating in an end connected to the other mobile frame by a universal joint, and abutment means on one of said first and second elongate members and a latch means on the other of said first and second elongate members releasably engaged with said abutment to hold said elongate members together in a rigid form for maintaining the mobile frames in spaced side-by-side relation while permitting said frames to change in angular relation and each of said frames to be raised and lowered independently of the other.

2. A twin-offset disc implement as set forth in claim 1 including:
   a. means connecting said tongue structures to said forward ends of said respective mobile frames to permit said tongue structures to move up and down in an arc about the respective forward ends;

b. means on each of said mobile frames and connected to said respective tongue structure and to said means for raising and lowering said frames for independently adjusting the vertical position of said respective forward end of each of said frames to position same in a substantially level position.

3. A twin-offset disc implement as set forth in claim 1 wherein said tongue structures each include:
   a. a base member mounted on a forward end of the respective frame, each of said base members being pivotally mounted for movement in an arc about the forward end of the respective frame;
   b. a draw member for each tongue structure and having one end thereof pivotally mounted on said respective base member and extending forwardly therefrom;
   c. an adjustable spreader member for each tongue structure and having opposite ends thereof pivotally connected to said base member and said draw member respectively of said respective tongue structure for adjusting an angular relation between said base member and said draw member; and
   d. means on a free end of each of said draw members for effecting a connection between same and the prime mover.

4. A twin-offset disc implement as set forth in claim 3 wherein said draw member connection means includes:
   a. an assembly mounted on a free end of one of said draw members and having means thereon for effecting a connection between said assembly and the prime mover;
   b. a towing ring mounted on said assembly and extending outwardly therefrom; and
   c. a pintle hook secured on a free end of the other draw member and releaseably engageable with said towing ring whereby forward movement of the prim mover effects forward movement of both of said mobile frames.

5. A twin-offset disc implement as set forth in claim 4 including adjustable means on each of said mobile frames and connected to said respective base member of said tongue structure thereon and to said means for raising and lowering said respective frame for independently adjusting the vertical position of said respective forward end of each of said frames to position same in a substantially level position.

6. A twin-offset disc implement comprising:
   a. a pair of spaced elongated frames positioned in side-by-side relation and each having a forward end and laterally spaced side members;
   b. a pair of longitudinally spaced gangs of earth working discs for each frame, at least one gang of discs on one frame having an end thereof in overlapping relation with an end of at least one gang of discs on the other frame;
   c. an elongated shaft rotatably mounted on each of said frames intermediate the ends thereof and having members depending therefrom and having means thereon for rotatably mounting ground engaging members to movably support said respective frames;
   d. means engaging each of said elongated shafts for selectively rotating same to thereby raise and lower said respective frame and gangs of discs thereon to move same into and out of an earth working position;
   e. an adjustable tongue structure for each frame and mounted on the forward end thereof;
   f. means on each of said tongue structures for effecting connection of same to a prime mover;
   g. fastening means connected to and extending between said mobile frames, said fastening means having a first elongate member with one end thereof connected to one mobile frame by a universal joint, said first elongate member having a tubular portion extending toward the other mobile frame, a second elongate member having a portion slideably and separably received in the tubular portion of said first elongate member and extending therefrom and terminating in an end connected to the other mobile frame by a universal joint, and abutment means on one of said first and second elongate members and a latch means on the other of said first and second elongate members releasably engaged with said abutment to hold said elongate members together in a rigid form for maintaining the mobile frames in spaced side-by-side relation while permitting said frames to change in angular relation and each of said frames to be raised and lowered independently of the other.

7. A twin-offset disc implement as set forth in claim 6 wherein said tongue structures each comprise:
   a. a base member mounted on a forward end of the respective frame, each of said base members being pivotally mounted for movement up and down in an arc about the forward end of the respective frame;
   b. a draw member for each tongue structure and having one end thereof pivotally mounted on said respective base member and extending forwardly therefrom;
   c. an adjustable spreader member for each tongue structure and having opposite ends thereof pivotally connected to said base member and said draw member respectively of said respective tongue structure for adjusting an angular relation between said base member and said draw member;
   d. a clevis assembly mounted on a free end of one of said draw members and having means thereon for effecting a connection between said clevis assembly and the prime mover;
   e. a towing ring mounted on said clevis assembly and extending laterally outwardly therefrom; and
   f. a pintle hook secured on a free end of the other draw member and releaseably engageable with said towing ring for effecting a connection between said tongue structures and the prime mover whereby forward movement of the prime mover effects forward movement of both of said mobile frames.

8. A twin-offset disc implement as set forth in claim 7 including adjustable means on each of said mobile frames and connected to said respective base member of said tongue structure thereon and to said elongated shaft on said respective frame for independently adjusting the vertical position of said respective forward end of each of said frames to position same in a substantially level position during earth working operations.

* * * * *